United States Patent
Robert

(10) Patent No.: US 9,574,963 B2
(45) Date of Patent: Feb. 21, 2017

(54) DEVICE FOR MONITORING A PROBE FOR MEASURING THE PRESSURE OF A FLOW

(71) Applicant: THALES, Courbevoie (FR)

(72) Inventor: François Robert, Chanceaux sur Choisille (FR)

(73) Assignee: THALES, Courbevoie (FR)

( * ) Notice: Subject to any disclaimer, the term of this patent is extended or adjusted under 35 U.S.C. 154(b) by 183 days.

(21) Appl. No.: 14/638,623

(22) Filed: Mar. 4, 2015

(65) Prior Publication Data
US 2015/0308913 A1    Oct. 29, 2015

(30) Foreign Application Priority Data

Mar. 4, 2014  (FR) ...................................... 14 00533

(51) Int. Cl.
| | |
|---|---|
| *G01L 27/00* | (2006.01) |
| *G01P 5/16* | (2006.01) |
| *G01P 21/02* | (2006.01) |
| *G01L 11/04* | (2006.01) |

(52) U.S. Cl.
CPC ................ *G01L 27/00* (2013.01); *G01L 11/04* (2013.01); *G01P 5/16* (2013.01); *G01P 21/025* (2013.01)

(58) Field of Classification Search
USPC .............................................. 73/1.59, 861.28
See application file for complete search history.

(56) References Cited

U.S. PATENT DOCUMENTS

| | | | | | |
|---|---|---|---|---|---|
| 3,788,140 | A | * | 1/1974 | Turtle ....................... | G01F 1/00 73/861.28 |
| 4,227,407 | A | * | 10/1980 | Drost ........................ | G01F 1/66 73/861.28 |
| 4,928,534 | A | * | 5/1990 | Ichino ..................... | G01F 1/662 73/861.18 |
| 5,257,536 | A | * | 11/1993 | Beigbeder ............. | G01P 13/025 73/170.02 |
| 6,178,827 | B1 | * | 1/2001 | Feller ..................... | G01F 1/662 73/861.22 |

(Continued)

FOREIGN PATENT DOCUMENTS

| | | |
|---|---|---|
| EP | 2015082 A2 | 1/2009 |
| FR | 2665539 A1 | 2/1992 |

(Continued)

*Primary Examiner* — Eric S McCall
*Assistant Examiner* — Mohammed E Keramet-Amircolai
(74) *Attorney, Agent, or Firm* — Baker & Hostetler LLP

(57) ABSTRACT

The invention relates to a device for monitoring a probe for measuring the pressure of a flow; the probe comprising an internal volume; the device comprising: an acoustic transmitter and receiver, a connection intended to connect the device to the probe, for the transmitter to transmit an acoustic signal in the internal volume and for the receiver to pick up an acoustic signal in the internal volume. The device also comprises an electronic module comprising: an audio transmission and reception circuit, linked to the transmitter and to the receiver by analog link, a non-erasable memory comprising a digital encryption key, an erasable read-only memory, a digital communication interface, configured to transmit or receive digital signals between the outside of the device and the audio circuit, the non-erasable memory and the erasable read-only memory.

14 Claims, 3 Drawing Sheets

(56) References Cited

U.S. PATENT DOCUMENTS

| | | | | |
|---|---|---|---|---|
| 6,305,233 B1 * | 10/2001 | Braathen | ............... | G01F 1/667 |
| | | | | 73/861.27 |
| 7,591,165 B2 * | 9/2009 | Papakostas | ............ | G01L 1/205 |
| | | | | 324/616 |
| 2007/0280046 A1 * | 12/2007 | Perez | ............... | G01L 19/0007 |
| | | | | 367/13 |
| 2008/0236297 A1 * | 10/2008 | Fleet | ..................... | G01F 1/662 |
| | | | | 73/861.28 |
| 2011/0283766 A1 | 11/2011 | Cummings | | |
| 2012/0118037 A1 * | 5/2012 | Leblond | ............... | G01P 21/025 |
| | | | | 73/1.25 |
| 2013/0204544 A1 | 8/2013 | Thomas | | |
| 2015/0153384 A1 * | 6/2015 | Robert | ................. | G01L 27/007 |
| | | | | 73/1.25 |

FOREIGN PATENT DOCUMENTS

| | | | |
|---|---|---|---|
| FR | 2959822 A1 | 11/2011 |
| WO | 0062081 A1 | 10/2000 |

\* cited by examiner

DEVICE FOR MONITORING A PROBE FOR MEASURING THE PRESSURE OF A FLOW

FIELD OF INVENTION

The invention relates to a device for monitoring a probe for measuring the pressure of a flow, and more particularly a device comprising an electronic module capable of communicating by a digital link with an external processing unit. The invention is particularly useful in the field of the pressure probes implemented in the aeronautical field.

BACKGROUND OF INVENTION

Piloting any aircraft entails knowing its relative speed in relation to the air, that is to say to the relative wind. This speed is determined using static pressure Ps and total pressure Pt measurement probes. The total Pt and static Ps pressures give the modulus of this speed vector. As is known, the total pressure Pt can be measured using a so-called Pitot tube. This is a tube that is open at one of its ends and blocked at the other. The open end of the tube faces substantially into the flow. The air stream situated upstream of the tube is progressively slowed down until it reaches an almost zero speed at the tube inlet. The slowing down of the speed of this air stream increases its pressure. This increased pressure forms the total pressure Pt of the air flow.

The principle of a total pressure measurement probe is recalled by FIG. 1. The probe 10 is intended to be fixed through an opening 11 produced in the skin 12 of an aircraft. The probe 10 comprises a part 13 external to the skin 12 and formed by a Pitot tube 14 borne by a strut 15. The probe 10 also comprises an internal part 16 essentially comprising an electrical connector 17 and a pneumatic connector 18. The connector 17 makes it possible to electrically connect the probe 10 to the aircraft, for example to connect heating means for the de-icing of the probe 10. The connector 18 makes it possible to pneumatically connect the Pitot tube 14 to a pressure sensor or other measurement device, situated inside the skin 12 of the aircraft. The probe 10 is positioned on the skin 12 of the aircraft in such a way that the Pitot tube 14 is oriented substantially along a longitudinal axis of the aircraft, outside the boundary limit, so that the direction of the flow, represented by an arrow 19 substantially faces an inlet orifice 20 situated at a first end 21 of the Pitot tube 14. In the example represented, the Pitot tube 14 is fixed relative to the skin 12 of the aircraft. It is of course possible to mount the Pitot tube 14 on a mobile strut such as, for example, a vane that can be oriented in the axis of the flow as for example described in the patent published under the number FR 2 665 539.

In practice, the air flow can carry solid or liquid particles, such as, for example, water from the clouds, likely to penetrate into the Pitot tube and to build up in the tube at the blocked end. To prevent such a build-up from disturbing the pressure measurement, there are generally provided one or more drain holes and water traps, to avoid any risk of obstruction of the pipe work responsible for transmitting the total pressure to the pressure sensors situated inside the skin of the aircraft or to the instruments of the aircraft instrument panel. As represented in FIG. 2, the Pitot tube 14 thus comprises, in proximity to an end 22, a drain hole 23 making it possible to evacuate particles likely to penetrate inside the tube 14. Still at the end 22 of the tube, a pneumatic line 24 opens into the tube 14 to form therein a pressure tap 40 where the air pressure is to be measured. The pressure tap 40 is generally constructed so as to avoid the ingress of water into the tube 14 and thus form a water trap. The line 24 is, for example, linked to a pressure sensor which is not represented in FIG. 2. The pressure sensor makes it possible to effectively measure the pressure of the air prevailing inside the tube 14 at its end 22. Apart from the drain hole or holes 23, whose sections are small compared to that of the tube 14, the tube is closed at its end 22. The pressure measured at this end therefore represents the total pressure Pt of the air flow.

The drain holes make it possible to evacuate the liquids and any particles that might penetrate into the tube. The slowing down of the air in the tube is not therefore complete and the total pressure Pt measurement is corrupted. More specifically, the greater the efforts made to avoid the build-up of water or of particles of significant size, the more the total pressure measurement is affected by increasing the dimensions or the number of drain holes. Conversely, the greater the efforts to improve the total pressure Pt measurement by reducing the dimensions or the number of drain holes, the more the risk of build-up of water or of particles increases. With the Pitot tube, a trade-off therefore has to be found between quality of the total pressure Pt measurement and risk of disturbing the measurement because of the penetration of water, and of particles conveyed by the air flow where the measurement is performed.

In the operational life of the aircraft, the drain holes can be polluted, because of the ingress of dust, of insects, of plant residues or other foreign bodies. Because of their size and the position of the Pitot tubes on the fuselage of an aircraft, periodically monitoring the integrity of the drain holes is not easy.

The drain holes of the Pitot tubes are generally checked visually. The operator responsible for the maintenance of the airplanes inspects the drain hole or holes using a small lamp. If foreign bodies are observed, the probe is dismantled, and its pneumatic circuits cleaned. This operation becomes all the more difficult when the airplane is of large size. Access to the probe and to the drain holes whose diameter is generally less than 1 mm is difficult.

Also known from the applicant is a monitoring device intended to be temporarily connected to the pressure measurement probe, and that makes it possible to monitor, using an acoustic transmitter and receiver, that the internal cavities and the drain holes of the probe are not blocked. The principle of such a device is notably described by the patent published under the reference FR 2 959 822. It is also reviewed in FIG. 2 of the present application. The monitoring device 25 comprises a transmitter 26 and a receiver 27 intended to be connected to an internal volume 30 of the probe, formed by the interior of the tube 14, the drain hole or holes 23 and the line 24. The transmitter transmits an acoustic signal that is propagated in the internal volume 30 and the receiver is configured to pick up an acoustic signal observed in the internal volume 30. The device also comprises processing means 28 that make it possible to compare the acoustic signal observed in the internal volume to a reference acoustic signal measured on a probe that is not clogged up, in order to establish the presence of particles in the internal volume.

As represented in FIG. 2, the processing means 28 are incorporated in the probe monitoring device. When the difference between the observed signal and the reference signal exceeds a predetermined threshold, the processing means alert the user, for example by means of a lamp 29 mounted on the device. This approach does, however, have limitations. In effect, to improve the reliability of the diagnosis of clogging of the probe, processing algorithms are considered that are more complex than simply comparing a signal difference to a threshold. These more complex algorithms can notably require various interactions with an operator. The incorporation of the processing means in the device connected to the probe mounted on the fuselage of the aircraft make these interactions between the operator and the device difficult. It is therefore desirable to have an apparatus that makes it possible to monitor a pressure measurement probe that is simultaneously reliable, safe and simple for a maintenance operator present in proximity to the aircraft equipped with the probe to be monitored.

SUMMARY OF INVENTION

To this end, the subject of the invention is a device for monitoring a probe for measuring the pressure of a flow; the probe comprising an internal volume and at least one orifice connected with the outside of the volume; the device comprising:

- an acoustic transmitter and receiver,
- connection means intended to connect the device to the probe, so that the transmitter transmits an acoustic signal that is propagated in the internal volume and so that the receiver picks up an acoustic signal observed in the internal volume,
- an electronic module comprising:
- an audio transmission and reception circuit, linked to the transmitter and to the receiver by an analog link,
- a non-erasable memory comprising a digital encryption key,
- an erasable read-only memory,
- a digital communication interface, configured to transmit or receive digital signals between the outside of the device and the audio circuit, the non-erasable memory and the erasable read-only memory.

Advantageously, the electronic module further comprises a sensor capable of measuring a temperature in proximity to the transmitter; the digital communication interface is configured to transmit the temperature measured by the sensor to the outside of the device.

Advantageously, the audio circuit has a sampling frequency greater than or equal to 22 kHz.

Advantageously, the digital communication interface is a USB port.

Advantageously, the device is intended to monitor a total pressure probe, static pressure probe, Pitot/static probe or totally or partially pneumatic incidence probe.

Advantageously, the electronic module comprises a connection circuit making it possible to couple the interface to at least one other element of the device out of: the audio transmission and reception circuit, the non-erasable memory, the erasable read-only memory, and the digital communication interface. The connection circuit can be driven by the digital communication interface.

The invention relates also to an apparatus for monitoring a probe for measuring the pressure of a flow, comprising:

- a monitoring device having the features described previously,
- a processing unit comprising a digital communication interface,
- digital link means between the digital communication interfaces of the monitoring device and of the processing unit.

Advantageously, the processing unit is a computer, a tablet or a smart phone.

Advantageously, the digital communication interfaces are two USB ports, and the digital link means are a USB cable.

In an advantageous implementation, the processing unit is configured to:

- control, via the audio circuit, the transmission of an acoustic signal that is propagated in the internal volume of the probe,
- receive and analyze an acoustic signal observed in the internal volume, picked up by the receiver and transmitted by the audio function.

Advantageously, the processing unit is configured to receive the temperature measured by the sensor and to correct the observed acoustic signal as a function of the measured temperature.

Advantageously, the processing unit is configured to receive and analyze the encryption key stored in the device, and authorize the analysis of the acoustic signal transmitted by the audio function.

Advantageously, the processing unit is configured to deliver a diagnosis of operation of the pressure measurement probe, based on the analysis of the acoustic signal transmitted by the audio function.

BRIEF DESCRIPTION OF THE DRAWINGS

The invention will be better understood and other advantages will become apparent on reading the detailed description of the embodiments given by way of example in the following figures.

In the interests of clarity, the same elements bear the same references in the different figures.

DETAILED DESCRIPTION OF THE INVENTION

The general idea of the present invention consists in distributing the processing means between the monitoring device and an external processing unit. The monitoring device is intended to be connected temporarily to a pressure measurement probe, in an aircraft maintenance operation. The processing unit comprises means for exchanging information with the device, means for exchanging information with a maintenance operator, and software making it possible to drive the probe monitoring operation, through the analysis of the information received from the device and from the operator, in order to diagnose and flag any clogging of the probe. The invention relates both to the monitoring device as such, and to the apparatus formed by this device and the processing unit.

Figure 1:
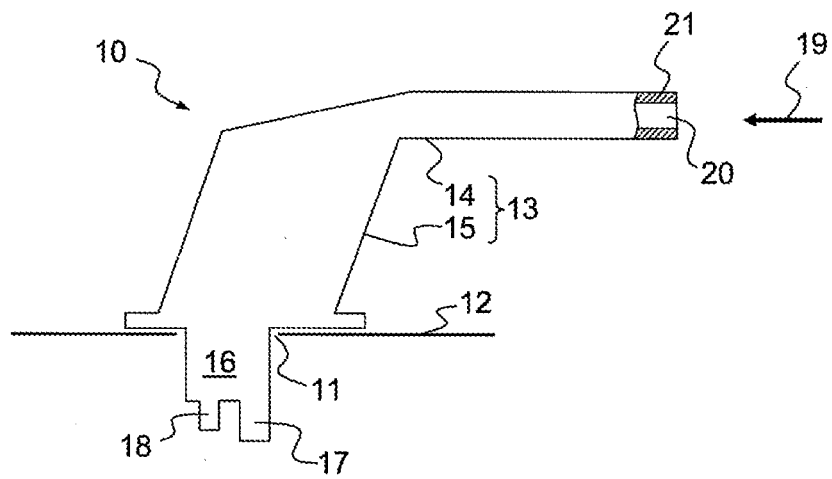
FIG. 1 already presented, represents a total pressure measurement probe according to the known prior art, FIG. 2 already presented, represents a partial view of the probe of FIG. 1 in the vicinity of which there is a monitoring device according to the known prior art.

Hereinbelow, the invention is described in relation to a total pressure measurement probe, similar to that described previously by FIG. 1. It is of course possible to implement it for a static pressure measurement probe, for a Pitot/static probe or for a totally or partially pneumatic incidence probe. Generally, the device according to the invention is intended to monitor a probe comprising an internal volume and at least one orifice connecting with the outside of the volume. In the case of the total pressure probe described previously, the internal volume 30 of the probe comprises the interior of the Pitot tube 14, the drain hole or holes 23 and the line 24 for example linked to a pressure sensor. In a widespread architecture, the probe comprises two drain holes formed facing one another in the Pitot tube.

Figure 2:
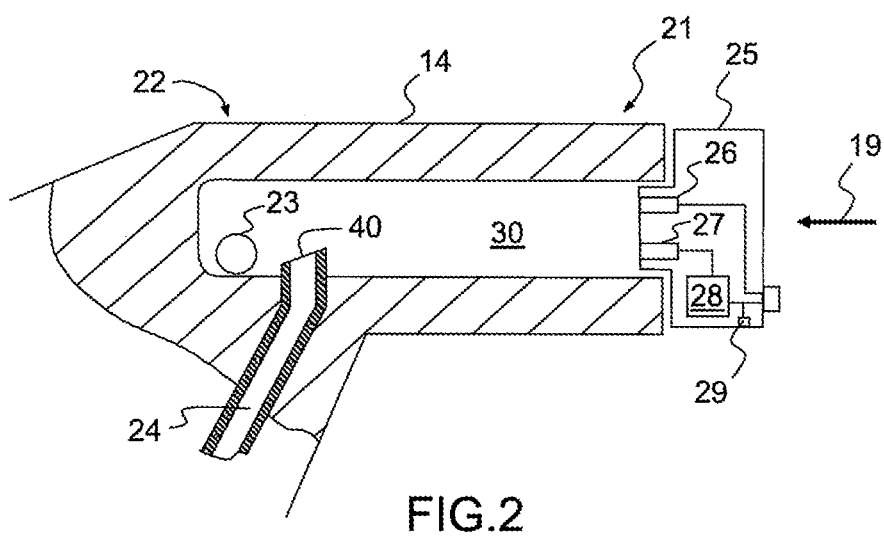
Figure 3:
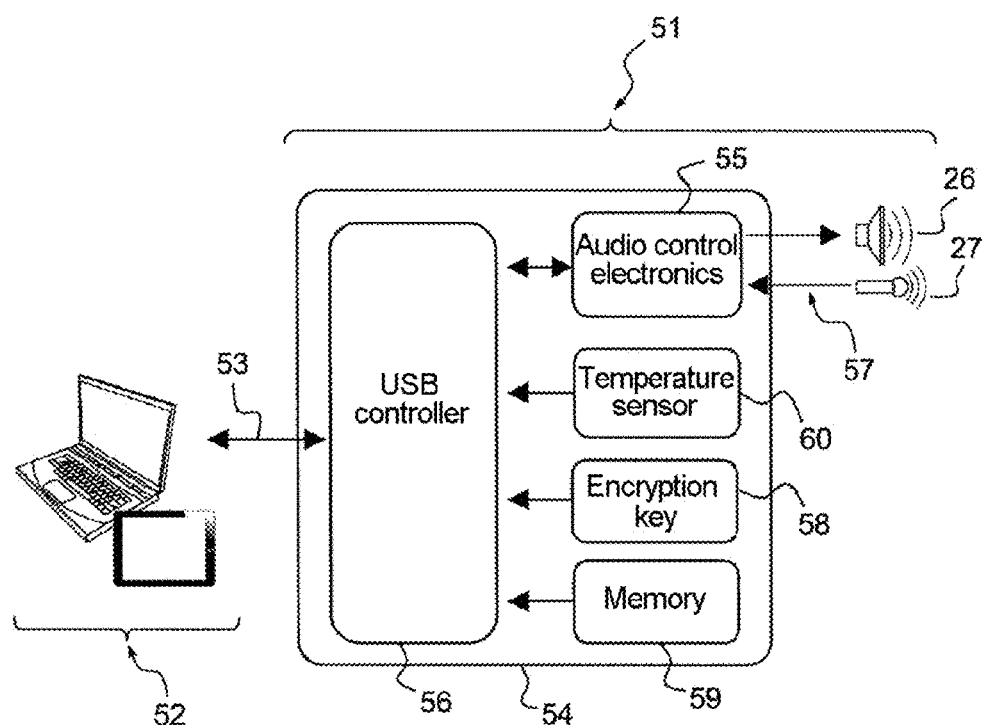
FIG. 3 represents an apparatus for monitoring a pressure measurement probe.

FIG. 3 represents an apparatus for monitoring a pressure measurement probe according to the invention. The monitoring apparatus 50 comprises a monitoring device 51 and a processing unit 52 that can be linked together by a link 53. The monitoring device 51 comprises elements, common to the device described in the preamble and represented in FIG. 2. The monitoring device 50 comprises in particular:
- an acoustic transmitter 26 and an acoustic receiver 27,
- connection means (not represented in FIG. 3) intended to connect the device 50 to the probe 10, in such a way that the transmitter 26 transmits an acoustic signal that is propagated in the internal volume 30 of the probe and in such a way that the receiver 27 picks up an acoustic signal observed in this internal volume 30.

The monitoring device 50 also comprises an electronic module 54 in which is implemented an audio transmission and reception circuit 55, linked to the transmitter 26 and to the receiver 27 by an analog link 57. The electronic module 54 is provided with an interface 56 configured to transmit or receive digital signals between the outside of the device and the audio function. Like a sound card, the audio circuit 55 is produced by means of an audio monitoring electronic card, configured to:
- receive a digital signal from the interface 56, transform this digital signal into an analog signal, and transmit this analog signal to the transmitter 26 via the analog link 57,
- receive an analog signal from the receiver 27 via the analog link 57, transform this analog signal into a digital signal, and transmit this digital signal to the interface 56.

The device 51 can be linked to the processing unit 52 by the digital link 53, for example of USB type, USB standing for Universal Serial Bus, and through digital communication interfaces, for example USB ports, of the device and of the processing unit.

The processing unit comprises a human-machine interface, or IHM, that makes it possible to display information intended for a maintenance operator and in return receive instructions therefrom to drive the maintenance operation. In the processing unit, software is implemented that makes it possible to drive the probe monitoring operation, and in particular diagnose any clogging of the probe. Thus, the processing unit comprises means for:
- receiving and analyzing instructions from a maintenance operator,
- controlling the probe monitoring device, and in particular controlling, via the audio function, the transmission of an acoustic signal that is propagated in the internal volume of the probe,
- receiving and analyzing an acoustic signal observed in the internal volume, picked up by the receiver and transmitted by the audio function,
- signaling a clogging of the probe to the maintenance operator.

This particular configuration distributing the driving and processing means between the device connected to the probe and the processing unit manipulated by the operator offers numerous advantages. The processing unit implemented is generic, it is, for example, a computer, a tablet or a smart phone. The processing unit can thus be used for uses other than the probe monitoring operation. Various applications use processing units of PC computer or tablet type equipped with USB ports in aircraft maintenance operations. Such equipment can be used for the monitoring operation, after installation of software dedicated to the monitoring device. The cost of the device is therefore significantly reduced.

Note that the processing units, such as a PC computer, for example portable, or a tablet or even a smart phone, are generally equipped with a sound card, similar to the audio function, and capable of handling the management of a microphone and a receiver or a loudspeaker. However, these sound cards generally incorporate filters at the input, known as AGC for Automatic Gain Control, specific to each computer or tablet model. The response acquired by the audio function is therefore variable depending on the models. This dispersion makes analysis of the acoustic signal by means of the sound card of the processing unit particularly difficult, and the accuracy of a clogging diagnosis limited.

Furthermore, the use of an audio function implemented in the processing unit means using an analog link to link the device connected to the probe mounted on the fuselage of the aircraft to the processing unit manipulated by the operator on the tarmac. This solution entails a significant length of cable, and therefore additional noise recovered on the cable providing the analog link which also degrades the accuracy of the clogging diagnosis.

Note also that the choice of USB link between the device and the processing unit also presents advantages. The electronic module of the device is electrically powered only through the USB port. There is no need to link the device to an electrical power source, limiting the number of cables needed. The alternative solution implementing a wireless link, for example according to the Wi-Fi protocol, does away with the physical link for exchanges with the processing unit but requires an electrical power supply. The electromagnetic field generated by the Wi-Fi solution also represents a disturbance that should be avoided in the immediate environment of the aircraft.

Thus, the product consists of a monitoring device and a right to use, by means of software hosted by any processing unit. The product manufactured and marketed relates to the value added constituents (monitoring device, software) and uses solutions that are available and in widespread use for other components (computer, tablet).

The monitoring device which incorporates a digital part ensuring the generation and the reception of analog signals and their conversion to digital remains copyable. To secure the simultaneous use of the two components of the apparatus, i.e. the device and the software, the latter comprises means for preventing the use of the software with a non-conforming monitoring device. Thus, the device comprises a non-erasable memory, commonly called ROM for Read-Only Memory, containing a digital encryption key 58. The software implemented in the processing unit comprises means for receiving and analyzing the digital encryption key 58, so as to recognize the device linked to the processing unit and, if necessary, authorizing the use of the software, or more specifically of the means of analyzing the acoustic signal transmitted by the device and for warning of a clogging of the probe. In other words, the processing unit comprises means for authenticating the device linked to the processing unit, based on a reading of the digital encryption key.

The monitoring device also comprises an electrically erasable and programmable read-only memory 59, commonly called EEPROM, standing for Electrically Erasable Programmable Read Only Memory, making it possible to back up data in the monitoring device, such as technical specifications of the sleeve, a history of use, a right of use, or even a date of next maintenance of the device. The data backed-up in the read-only memory of the device are accessible to the processing unit. The processing unit can also write information into the read-only memory.

In a preferred implementation of the invention, the device also comprises a temperature sensor 60, configured to measure a temperature in proximity to the transmitter 26. The temperature sensor 60 is linked to the digital communication interface 56 of the device. The digital communication interface is configured to transmit the temperature measured by the sensor to the outside of the device. It is advantageous to know the temperature in the environment of the acoustic transmitter. The specifications of the loudspeaker are affected by the temperature; the behavior of the membrane of the loudspeaker being dependent on the temperature. To improve the accuracy of the diagnosis of clogging of the probe, the algorithms for processing the acoustic signal observed in the internal volume take into account, for example in the form of a correction curve, the temperature variations. In other words, the processing unit also comprises means for receiving and analyzing the temperature measured by the sensor.

Figure 4:
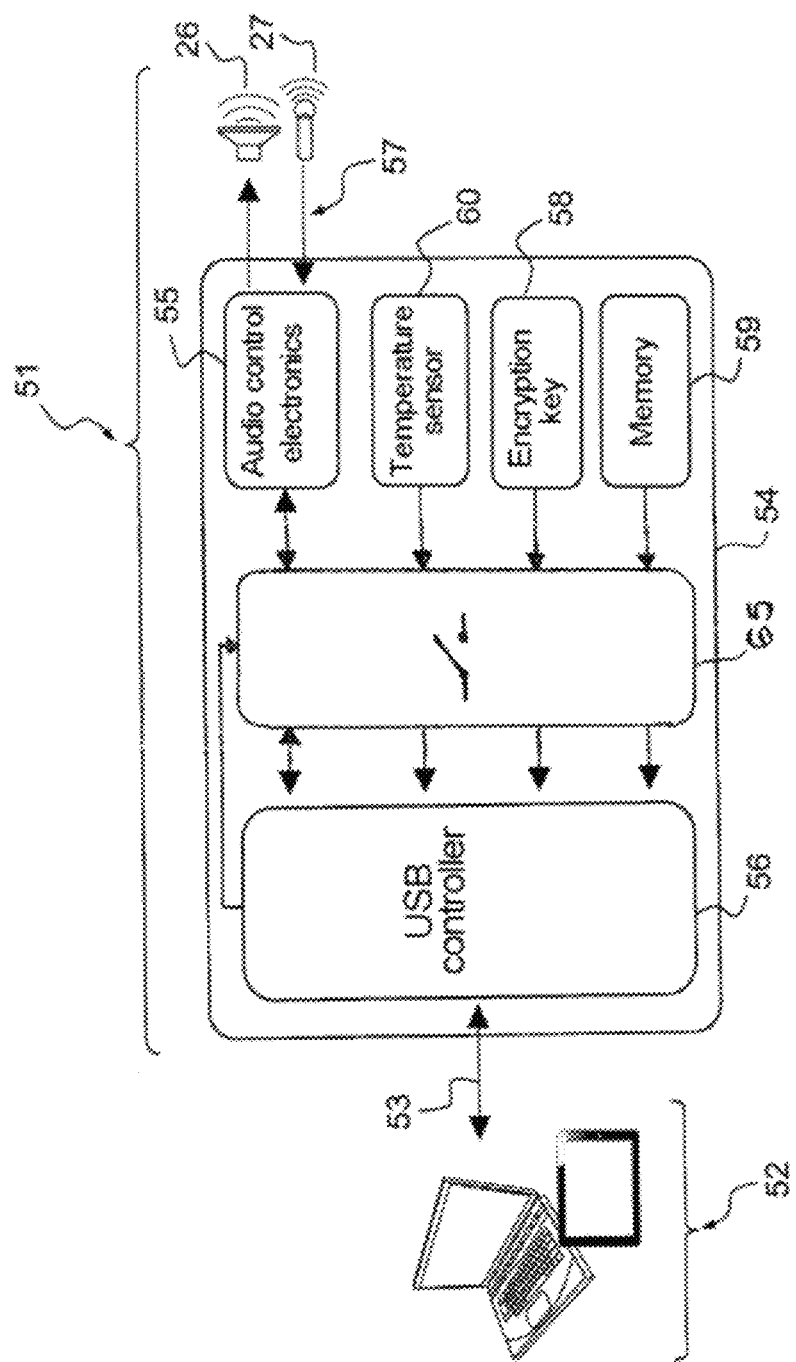
FIG. 4 represents a variant of the monitoring apparatus of FIG. 3.

FIG. 4 represents a variant of the monitoring apparatus. In this variant, the electronic module 54 comprises a connection circuit 65 that makes it possible to connect the interface 56 to at least one of the other elements of the device, namely the audio transmission and reception circuit 55, the memory 58 containing the encryption key, the read-only memory 59 and the temperature sensor 60. The connection circuit 65 is driven by the interface 56. The connection circuit 65 links the interface 56 to the different elements which are connected to it only when the interface 56 is activated by the processing unit 52 through the link 53. When the interface 56 is not activated, the elements are not linked to the interface, which makes it possible to limit the electrical consumption of the electronic module 54.

To sum up, the invention relates to an apparatus comprising, on the one hand, a monitoring device intended to be connected to the pressure measurement probe mounted on the fuselage of an aircraft, and, on the other hand, a processing unit manipulated by a maintenance operator positioned in proximity to the aircraft. The monitoring device comprises an audio part, typically comprising a loudspeaker (generally associated with an amplifier to generate the necessary power) and a microphone (generally associated with a preamplifier before sampling) and an electronic module notably responsible for handling the digital conversion of the analog signals from the audio part. For its part, the processing unit comprises a human-machine interface allowing dialogue with the operator. It also comprises software capable of exchanging, in digital form, information and commands with the device. To secure the simultaneous use of the software and of the monitoring device, a digital encryption key is permanently stored on a non-erasable memory of the electronic module. The software is then configured to authenticate the device linked to the processing unit, by comparing the encryption key stored in the device with an encryption key known to the software. A read-only memory also makes it possible to store in the device various information specific to the device and to its history.

The invention therefore relates to the device comprising the audio part and the electronic module. It relates also to the apparatus formed by the device and the processing unit hosting processing software matched to the device. The software comprises a set of means for processing the digital signals transmitted by the device. In a particular merchantable form, the software intended to be installed on any processing unit is stored on a computer medium such as a CD-ROM or a USB key. The invention then relates to the apparatus comprising the device and the computer medium containing the code instructions forming the means for processing the digital signals transmitted by the device.

The invention claimed is:

1. A device for monitoring a probe for measuring the pressure of a flow; the probe comprising an internal volume and at least one orifice connected with the outside of the volume; the device comprising:
   an acoustic transmitter and receiver,
   connection means connecting the device to the probe, so that the transmitter transmits an acoustic signal that is propagated in the internal volume and so that the receiver picks up an acoustic signal observed in the internal volume,
   an electronic module comprising:
      an audio transmission and reception circuit, linked to the transmitter and to the receiver by an analog link,
      a non-erasable memory comprising a digital encryption key,
      an erasable read-only memory,
      a digital communication interface, configured to transmit or receive digital signals between the outside of the device and the audio circuit, the non-erasable memory and the erasable read-only memory.

2. The device according to claim 1, in which the electronic module further comprises a sensor capable of measuring a temperature in proximity to the transmitter; the digital communication interface being configured to transmit the temperature measured by the sensor to the outside of the device.

3. The device according to claim 1, in which the audio circuit has a sampling frequency greater than or equal to 22 kHz.

4. The device according to claim 1, in which the digital communication interface is a USB port.

5. The device according to claim 1, configured to monitor a total pressure probe, static pressure probe, Pitot/static probe or totally or partially pneumatic incidence probe.

6. The device according to claim 1, in which the electronic module comprises a connection circuit making it possible to couple the interface to at least one other element of the device out of: the audio transmission and reception circuit, the non-erasable memory, the erasable read-only memory, and the digital communication interface.

7. The device according to claim 6, in which the connection circuit is driven by the digital communication interface.

8. Apparatus for monitoring a probe for measuring the pressure of a flow, comprising:
   a monitoring device according to claim 1,
   a processing unit comprising a digital communication interface,
   digital link means between the digital communication interfaces of the monitoring device and of the processing unit.

9. Apparatus according to claim 8, in which the processing unit is a computer, a tablet or a smart phone.

10. Apparatus according to claim 8, in which the digital communication interfaces are two USB ports, and the digital link means of which are a USB cable.

11. Apparatus according to claim 8, in which the processing unit is configured to:
   control, via the audio circuit, the transmission of an acoustic signal that is propagated in the internal volume of the probe, receive and analyze an acoustic signal observed in the internal volume, picked up by the receiver and transmitted by the audio circuit.

12. Apparatus according to claim 11, in which the electronic module further comprises a sensor capable of measuring a temperature in proximity to the transmitter; the digital communication interface being configured to transmit the temperature measured by the sensor to the outside of the device, and the processing unit of which is configured to receive the temperature measured by the sensor and to correct the observed acoustic signal as a function of the measured temperature.

13. Apparatus according to claim 11, in which the processing unit is configured to receive and analyze the encryption key stored in the device, and authorize the analysis of the acoustic signal transmitted by the audio circuit.

14. Apparatus according to claim 11, in which the processing unit is configured to deliver a diagnosis of operation of the pressure measurement probe, based on the analysis of the acoustic signal transmitted by the audio circuit.

* * * * *